United States Patent [19]

Hölscher

[11] 4,307,397
[45] Dec. 22, 1981

[54] METHOD OF AND APPARATUS FOR MEASURING DISTANCE

[75] Inventor: Hobbe D. Hölscher, Randburg, South Africa

[73] Assignee: The South African Inventions Development Corporation, Pretoria, South Africa

[21] Appl. No.: 964,843

[22] Filed: Nov. 29, 1978

[30] Foreign Application Priority Data

Dec. 5, 1977 [ZA] South Africa .................. 77/7208
Aug. 16, 1978 [ZA] South Africa .................. 78/4654

[51] Int. Cl.³ .......................................... G01S 13/08
[52] U.S. Cl. .......................................... 343/12 R
[58] Field of Search .................................. 343/12 R

[56] References Cited

U.S. PATENT DOCUMENTS

| | | | |
|---|---|---|---|
| 2,742,638 | 4/1956 | Haywood et al. | 343/12 R |
| 3,213,449 | 10/1965 | Kobayashi et al. | 343/12 R |
| 3,229,285 | 1/1966 | Wadley | 343/12 R |
| 3,241,139 | 3/1966 | Wadley | 343/12 R |
| 3,300,780 | 1/1967 | Mason | 343/12 R |
| 3,315,257 | 4/1967 | Sauberlich | 343/12 R |
| 3,611,368 | 10/1971 | Crownover | 343/12 R X |
| 3,701,151 | 10/1972 | Sato et al. | 343/12 R X |
| 3,725,920 | 4/1973 | Küpfer | 343/12 R X |
| 4,072,946 | 2/1978 | Kneefel | 343/12 R |

Primary Examiner—T. H. Tubbesing
Attorney, Agent, or Firm—Ladas & Parry

[57] ABSTRACT

This invention relates to a method and apparatus for determining the distance between two positions utilizing electromagnetic waves (EMW's) and the Tellurometer principle. However, instead of utilizing a separate auxiliary EMW at the remote position for each measuring EMW transmitted from the master position a single auxiliary EMW is generated at the remote position and this single auxiliary EMW is utilized with several measuring EMW's. The measuring EMW's have frequencies that differ from that of the auxiliary EMW by similar amounts. Further, the measuring EMW's have frequencies of suitable values so that pattern frequencies and their phase shifts can be derived directly from some of the measuring EMW's and from the difference between appropriate measuring EMW's. The invention is extended, where a large number of measuring EMW's are needed to provide sufficient pattern frequencies for the degree of accuracy required, by providing a plurality of auxiliary EMW's at suitably different frequencies. All of these auxiliary EMW's are simultaneously generated and transmitted, the appropriate auxiliary EMW for a particular measuring EMW being automatically selected by filtering action at the master and remote positions.

29 Claims, 4 Drawing Figures

METHOD OF AND APPARATUS FOR MEASURING DISTANCE

This invention relates to a method of and an apparatus for determining the linear separation between two spaced-apart positions. In particular it relates to such a method and apparatus utilising the phase shift of an electromagnetic wave (EMW) transmitted between the two positions.

The applicant is aware of such systems in which the distance between the two positions is determined to a high degree of accuracy by determining the phase shift of an EMW having a suitably high frequency, and by resolving ambiguities in the phase shift by determining the phase shift of one or more EMW at lower frequencies. These are known as pattern EMW's, and their frequencies as pattern frequencies.

It is further known to the applicant to determine the phase shifts of these pattern EMW's not by transmitting EMW's at these frequencies between the two positions, but by transmitting EMW's at so called measuring frequencies which are at suitable values so that some, or all, of the frequencies of the pattern EMW's are the sum or difference of appropriate measuring frequencies. The phase shift of each pattern EMW is then the sum or difference of the phase shifts of the appropriate measuring EMW's.

Still further, the applicant is aware of a particular system, the Tellurometer system, in which the phase shift of each measuring EMW is determined by generating and transmitting a measuring EMW at each measuring frequency from a first one of the positions (termed the 'master' station) and generating and transmitting a corresponding auxiliary EMW from the other position (termed the 'remote' station) for each measuring EMW, the frequency of each auxiliary EMW being slightly smaller or greater than that of its corresponding measuring frequency. This system is described in U.S. Pat. No. 2,907,999. Thus, as a series of EMW's are sequentially transmitted from the master station, a corresponding number of auxiliary EMW's are synchronously transmitted from the remote station. Further, at both the master and remote stations a comparison EMW is derived which is the difference between each measuring EMW and its corresponding auxiliary EMW. Thus the comparison EMW's have comparison frequencies that are equal to the difference of the corresponding measuring and auxiliary frequencies.

With such a system the comparison EMW derived at the remote station is transmitted back to the master station. The phase angle of the comparison EMW derived at the master station is then compared with the phase angle of the comparison EMW from the remote station received at the master station, to provide the phase shift of the measuring EMW that would result if the measuring EMW itself were propagated from the master station to the remote station and back.

Although such a system generally gives satisfactory performance it does suffer certain disadvantages. For example, in hydrographic applications at least one of the master and remote stations is on a boat. The movement of the boat frequently causes contact between the two stations to be broken. Further, when the remote station is automatically operated, when contact is broken, the remote station switches to the next measuring frequency with the result that the process is interrupted.

According to the invention there is provided a method of determining the linear separation between a first and a second position, including generating at the second position an auxiliary electromagnetic wave (EMW) of a constant predetermined frequency;

sequentially generating at the first position a series of at least three measuring EMW's that have frequencies that are suitably different from one another and suitably different from that of the auxiliary EMW;

transmitting the auxiliary EMW, and sequentially each measuring EMW between the two positions;

determining the propagation phase shift of each measuring EMW utilising the auxiliary EMW; and processing the phase shifts of the various measuring EMW's to determine the distance between the first and second positions.

It will be understood that the term 'EMW' has been used as a matter of convenience in conjunction with both transmission paths and circuitry.

For each measuring EMW the measuring EMW may be transmitted from the first position to the second position and received at the second position;

a first phase value of the received measuring EMW may be derived at the second position;

the auxiliary EMW may be transmitted from the second position to the first position and received at the first position;

the first phase value of the received measuring EMW may be transmitted in a suitable manner, utilising the auxiliary EMW, from the second position to the first position and received at the first position;

a second phase value of the received auxiliary EMW may be derived at the first position; and the first phase value received at the first position and the second phase value derived at the first position may be processed to provide a signal equivalent to the phase shift of the measuring EMW.

Further, and preferably, for each measuring EMW a remote comparison EMW representative of the difference between the received measuring EMW and the auxiliary EMW may be generated at the second position;

the remote comparison EMW may also be transmitted from the second position to the first position and received at the first position;

a master comparison EMW representative of the difference between the measuring EMW and the received auxiliary EMW may be generated at the first position; and the difference in phase between the master comparison EMW and the received remote comparison EMW may be determined at the first position; and the phase values between the master comparison EMW's and the received remote comparison EMW's for the various measuring EMW's may be processed to determine the distance between the first and second positions.

Further according to the invention there is provided an apparatus for determining the linear separation between a first and a second position, including an auxiliary EMW generating means, locatable at the second position for generating at the second position an auxiliary EMW of a constant predetermined frequency;

a measuring EMW generating means, locatable at the first position for sequentially generating at the first position a series of at least three measuring EMW's that have frequencies that are suitably different from one another and suitably different from that of the auxiliary EMW;

a transmitting means for transmitting the auxiliary EMW, and sequentially each measuring EMW between the two positions; and a phase shift determining means for determining the propagation phase shift of each measuring EMW utilising the auxiliary EMW.

The apparatus may include a master transmitting means locatable at the first position for transmitting the measuring EMW's from the first position to the second position;

a remote receiving means locatable at the second position for receiving the measuring EMW's transmitted from the first position;

a first phase value deriving means locatable at the second position for deriving a first phase value of the received measuring EMW;

a remote transmitting means locatable at the second position for transmitting from the second position to the first position the auxiliary EMW and the first phase value, utilising the auxiliary EMW;

a master receiving means locatable at the first position for receiving the first phase difference and the auxiliary EMW at the first position;

a second phase value deriving means locatable at the first position for deriving a second phase value of the auxiliary EMW received at the first position; and a processing means for processing the first phase value and the second phase value to provide a signal equivalent to the phase shift of the measuring EMW.

Preferably the apparatus may include a remote comparison EMW generating means locatable at the second position for generating a remote comparison EMW representative of the difference between each received measuring EMW and the auxiliary EMW generated at the second position;

the remote transmitting means being adapted to transmit the remote comparison EMW from the second position to the first position and the master receiving means being adapted to receive the transmitted remote comparison EMW; and a master comparison EMW generating means locatable at the first position for generating a master comparison EMW representative of the difference between the measuring EMW and the received auxiliary EMW at the first position;

the processing means being in the form of a comparison EMW phase difference determining means locatable at the first position which is adapted to determine the difference in phase between the master comparison EMW and the received remote comparison EMW at the first position for the various measuring EMW's.

Conveniently, the remote comparison EMW generating means and the master comparison EMW generating means may generate the comparison EMW's by heterodyning techniques.

As indicated earlier, the phase differences determined by the comparison EMW phase difference determining means from the comparison EMW's for each measuring EMW, is the phase shift which each appropriate measuring EMW would experience if it were propagated from the first position to the second position and back.

The measuring EMW generating means may generate some measuring EMW's having a frequency less than that of the auxiliary EMW, and some having a frequency greater than that of the auxiliary EMW. Preferably, the measuring EMW generating means generates at least two measuring EMW's, one of which has a frequency a predetermined amount less than the frequency of the auxiliary EMW, and the other has a frequency the same amount greater than the frequency of the auxiliary EMW. Further, this predetermined amount may be half the frequency of a desired pattern EMW.

It will further be understood that the phase shifts for suitable pattern EMW's may be obtained by the measuring EMW generating means generating EMW's at the pattern frequencies, or having suitable frequencies such that the differences and/or sums of the frequencies of two or more suitably selected measuring EMW's equal the desired frequencies of the pattern EMW's.

In a particular preferred embodiment, the first measuring EMW may be at the same frequency as one of the desired pattern EMW's, to give a direct value of phase shift. This first measuring EMW may have the highest frequency of all the measuring EMW's and may be at the highest required pattern frequency. As indicated earlier, a second measuring EMW may then have a frequency equal to that of the first measuring EMW minus the frequency of the pattern EMW having the next smaller frequency. Further, the auxiliary EMW may have a frequency midway between those of the first and second measuring EMW's. In such a case it may be shown that by adding together the phase shifts for these two measuring EMW's, errors introduced by the equipment may be reduced, thereby enabling some or all of the determined phase differences to be corrected.

It will further be appreciated by those skilled in the art that normally some or all of the various EMW's will not be transmitted directly, but as modulations of suitable carrier EMW's. Thus master and remote carrier EMW generating means may be provided at the first and second positions respectively, with suitable master and remote modulating means. Further, the receiving means may then be adapted to receive the carrier EMW's with suitable master and remote demodulating means being provided to extract the desired EMW's. Naturally, the carrier EMW's will have suitably different frequencies. Further, any suitable modulation technique such as amplitude, frequency, or pulse modulation may be utilised.

In a preferred form the carrier EMW's have frequencies in the 1 GHz to 150 GHz range, with a difference lying between 1 MHz and 100 MHz, as this provides a suitable intermediate frequency (I.F.).

Persons skilled in the art will further appreciate that with such carrier EMW's in the microwave range a single transmitter/receiver may be utilised at each of the first and second positions. Such a transmitter/receiver will then mix simultaneously transmitted and received signals to provide a signal with a complex frequency spectrum resulting from the modulation of the carrier EMW's. Thus, with carrier EMW's in the microwave range a signal at the I.F. will be provided that is modulated by the measuring EMW's, the auxiliary EMW and the like.

It will then be necessary to process this I.F. signal, by amplifiers, filters and the like. Suitable such processing units must then have a suitably large bandpass characteristic that the I.F. sidebands resulting from the comparison frequencies are in a substantially linear phase shift region thereof. Ideally, the phase shift introduced by the processing units on these sidebands should be as small as possible. Naturally, the processing units must have bandwidths that are substantially less than twice the lowest frequency of the measuring and auxiliary EMW's.

It will also be appreciated by those skilled in the art that pattern frequencies of any suitable values may be utilised. However, it is preferred to have pattern frequencies of values $F_s$, $F_s b$, $F_s b^2$ ... $F_s b^n$, where $F_s$ has a corresponding wavelength which is at least as great as the longest distance to be determined unambiguously, b is a suitable base and n is sufficiently great for the highest pattern frequency $F_s b^n$ to determine the distance to the required degree of accuracy. Although b may have any suitable value, a preferred value of b is 10.

Thus, in a preferred form, the measuring EMW of highest frequency has a frequency $F_{m1}=F_s b^n$; the measuring EMW of lowest frequency has a frequency $F_{m2}=F_{m1}-F_s b^{n-1}$; and the other measuring EMW's have frequencies inbetween these values. Thus these other measuring EMW's will have frequencies that differ from $F_{m1}$ and/or $F_{m2}$ and/or one another by the values $F_s b^{n-2}$, $F_s b^{n-3}$ ... $F_s$. Further, the auxiliary EMW then has a frequency value $F_a=F_{m1}-0.5 F_s b^{n-1}$.

However, it will be appreciated that in practice it is necessary to limit the bandpass characteristic of the I.F. processing units in order to filter out unwanted sidebands of the measuring EMW's. Thus, it may occur that the comparison frequency of 0.5 $F_s b^{n-1}$ for the measuring EMW's of frequency $F_{m1}$ and $F_{m2}$ may be comparatively high and may fall outside the bandwidth of these units or be phase shifted an unacceptable amount, if a great distance is to be determined to a high degree of accuracy.

Thus, the invention may be extended to include the continuous simultaneous generation and transmission of two constant frequency auxiliary EMW's at the second position. From the first position will then be sequentially generated and transmitted a number of measuring EMW's, some of which are of greater or lesser frequency than that of a first one of the auxiliary EMW's by a maximum comparison frequency, and the others have a frequency either greater or lesser than that of the other second auxiliary EMW, by a maximum comparison frequency of similar magnitude.

It will then be appreciated that the auxiliary EMW's will have frequencies sufficiently far apart in comparison with the bandwidth of the I.F. processing units, or other filtering units, that the appropriate auxiliary EMW will be selected in accordance with the particular measuring EMW at the time.

The auxiliary EMW generating means may thus be adapted to generate simultaneously a plurality of auxiliary EMW's at the second position, a plurality of the measuring EMW's being associated with a first one of the auxiliary EMW's and at least one further measuring EMW being associated with each of the other auxiliary EMW's, a different measuring EMW being associated with each auxiliary EMW. Further the measuring EMW generating means and the auxiliary EMW generating means may be adapted to generate measuring EMW's all having frequencies that differ from the frequency of their associated auxiliary EMW by a value less than a suitably small maximum predetermined amount, auxiliary EMW's having suitably different frequencies, and measuring EMW's associated with any auxiliary EMW having frequencies sufficiently different from those of the other measuring EMW's such that the appropriate auxiliary EMW associated with any measuring EMW may be automatically selected; and the apparatus may then include selection means for automatically selecting the appropriate auxiliary EMW associated with any measuring EMW.

With such an arrangement where two auxiliary EMW's are simultaneously generated, two frequency spectrums are possible.

In a first possibility, where it is desired the measuring EMW's have low values, the auxiliary EMW's have frequencies of the order of $F_s b^n$ and $F_s b^{n-1}$. More particularly, one of the measuring EMW's has a frequency $=F_s b^n$, and another a frequency $=F_s b^{n-1}$ and the auxiliary EMW's have frequency values $F_{a1}=F_s b^n \pm 0.5 F_s b^{n-2}$ and $F_{a2}=F_s b^{n-1} \pm 0.5 F_s b^{n-2}$, respectively. The other measuring EMW's then have frequency values between $F_{a2}-0.5 F_s b^{n-2}$ and $F_{a2}+0.5 F_s b^{n-2}$. This spectrum is suitable for dynamic situations, ie where the first and/or second positions is not stationary, to minimise phase shift variations in the measuring EMW's.

On the other hand, when it is desirable for the frequency spectrum to have a narrow band, the auxiliary EMW's have frequencies of the order of $F_s b^n$ and are separated by an amount of the order of $F_s b^{n-1}$. Thus, one of the measuring EMW's has a frequency $=F_s b^n$ and another a frequency $=F_s b^n - F_s b^{n-1}$. The auxiliary EMW's then preferably have frequency values $F_{a1}=F_s b^n \pm 0.5 F_s b^{n-2}$ and $F_{a2}=F_s b^n - F_s b^{n-1} \pm 0.5 F_s b^{n-2}$. The other measuring EMW's then have frequency values between either $F_{a1}-0.5 F_s b^{n-2}$ and $F_{a1}+0.5 F_s b^{n-2}$ or between $F_{a2}-0.5 F_s b^{n-2}$ and $F_{a2}+0.5 F_s b^{n-2}$.

Those skilled in the art will be aware that the EMW's may conveniently be transmitted etherially.

The invention is now described, by way of examples with reference to the accompanying tables and drawings, in which:

Tables 1, 2 and 3 show the pattern frequencies and comparison frequencies for three different systems, systems A, B and C respectively;

Figure 1:
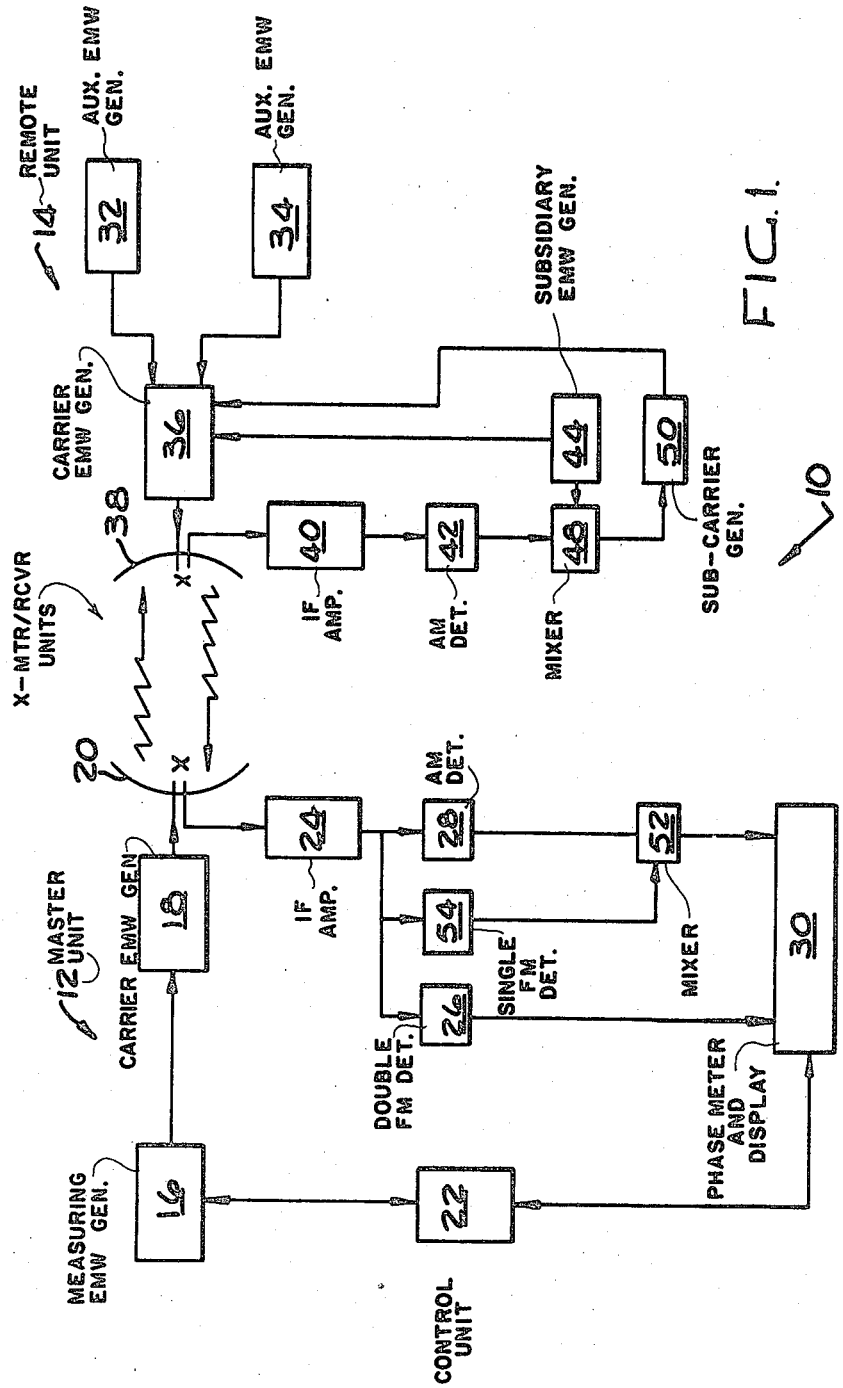
FIG. 1 shows a block diagram of an apparatus according to the invention.

Referring to FIG. 1, an apparatus for determining the linear separation between a first and a second position is shown, designated generally by reference numeral 10. The apparatus 10 comprises two units, a first master unit 12 and a second remote unit 14. The master unit 12 has a generator 16 for sequentially generating a series of measuring EMW's having suitable frequency values determined in a manner as will be described hereinafter with reference to Tables 1, 2 and 3 and FIGS. 2, 3 and 4. The master unit 12 further has a generator 18 for generating a microwave carrier EMW which is frequency modulated by the measuring EMW generated by the generator 16, a transmitter and receiver 20 for transmitting the modulated carrier EMW and for receiving signals from the remote unit 14, a control unit 22 for controlling the operation of the generator 16, an I.F.

amplifier 24 having a suitable bandwidth, a double F.M. detector 26, a single F.M. detector 54, an A.M. detector 28, a mixer 52 and a phase meter and display 30.

The remote unit has two generators 32 and 34 for continuously generating two auxiliary EMW's having constant frequency values of $F_{a1}$ and $F_{a2}$ respectively, a microwave carrier EMW generator 36 which is frequency modulated by the auxiliary EMW's, a receiver and transmitter 38 for transmitting signals generated by the remote unit 14 and for receiving signals transmitted from the master unit 12, an I.F. amplifier 40 having a suitable bandwidth as will be indicated below, an A.M. detector 42, a mixer 48, a subsidiary EMW generator 44 and a sub-carrier generator 50 for generating a sub-carrier which is frequency modulated by the signal provided by the mixer 48 and is itself frequency modulated onto the carrier EMW generated by the generator 36. The subsidiary EMW generator 44 is also frequency modulated onto the carrier EMW. The frequency of the carrier generated by the generator 18 is 3000 MHz whereas the generator 36 generates a carrier having a frequency of 3033 MHz. It will further be appreciated that the transmitter and receivers 20 and 38 are such that they heterodyne transmitted and received signals to provide an I.F. signal at 33 MHz which has a number of sidebands determined by the frequencies of the measuring EMW at the time, the two auxiliary EMW's, the sub-carrier (which has a frequency of 100 KHz) and the subsidiary EMW (which has a frequency of 67,5 KHz). The I.F. amplifiers 24 and 40 thus have suitably narrow bandwidths to pass only the first sidebands resulting from the difference between the measuring EMW and the auxiliary EMW that has a frequency closest to it, for all of the measuring EMW's. Thus, depending on the particular measuring EMW utilised, the appropriate auxiliary EMW will be automatically selected and utilised.

Thus, the modulated carrier radiated from the master unit 12 is received at the remote unit and heterodyned with the modulated carrier generated by the generator 36. The resultant amplitude modulated I.F. signal is amplified by the I.F. amplifier 40, only the first sidebands being passed, as indicated above. These sidebands are separated from the I.F. frequency by a value termed the comparison frequency, which as indicated above is the difference in frequency between the measuring EMW at the time and the relevant one of the two auxiliary EMW's. This modulated I.F. signal is then demodulated by the detector 42 to provide a remote comparison EMW which includes the phase difference between the measuring EMW received at the remote unit 14 and the appropriate auxiliary EMW generated by it. The remote comparison EMW is heterodyned with the subsidiary EMW to provide a derived EMW at a suitably lower frequency. The sub-carrier provided by the generator 50 is then frequency modulated by this derived EMW and is itself modulated onto the carrier wave generated by the generator 36. As the subsidiary EMW is also frequency modulated onto the carrier wave, the remote comparison EMW is indirectly modulated onto the carrier wave. This carrier wave, which is frequency modulated by the two auxiliary EMW's, by the sub-carrier and by the subsidiary EMW, is then transmitted from the remote unit 14 to be received by the master unit 12.

At the master unit a similar process takes place. The received carrier transmitted from the remote unit 14 is heterodyned with the local modulated carrier to produce an I.F. signal which is frequency modulated by the subsidiary EMW and the sub-carrier, which is itself frequency modulated by the remote comparison EMW generated by the remote unit, and also amplitude modulated by a master comparison EMW resulting from the difference between the locally generated measuring EMW and the appropriate received auxiliary EMW. The remote derived EMW generated at the remote unit 14 by the mixer 48 is then provided by the double F.M. detector 26, the subsidiary EMW is provided by the F.M. detector 54 and the locally generated master comparison EMW is provided by the A.M. detector 28. The master comparison EMW is heterodyned with the subsidiary EMW provided by the detector 54 in the mixer 52 to provide a master derived EMW. The difference in phase angle between these two derived EMW's is then determined by the phase meter 30 and displayed. This phase difference is also the phase angle between the comparison EMW's and the phase shift which an EMW at the frequency of the measuring EMW at the time would undergo, if it were propagated from the master unit 12 to the remote unit 14 and back again to the master unit 12.

It will be appreciated that the subsidiary EMW provided by the detector 54 may be combined with the derived EMW provided by the detector 26, thereby restoring the remote comparison EMW as it would have been received at the master unit. The phase difference between this restored comparison EMW and the master comparison EMW provided by the detector 28 may be determined.

The phase differences for the various measuring EMW's are then processed to provide the phase shifts which would result from the propagation of EMW's at suitable pattern frequencies as is described hereinafter.

Figure 2:
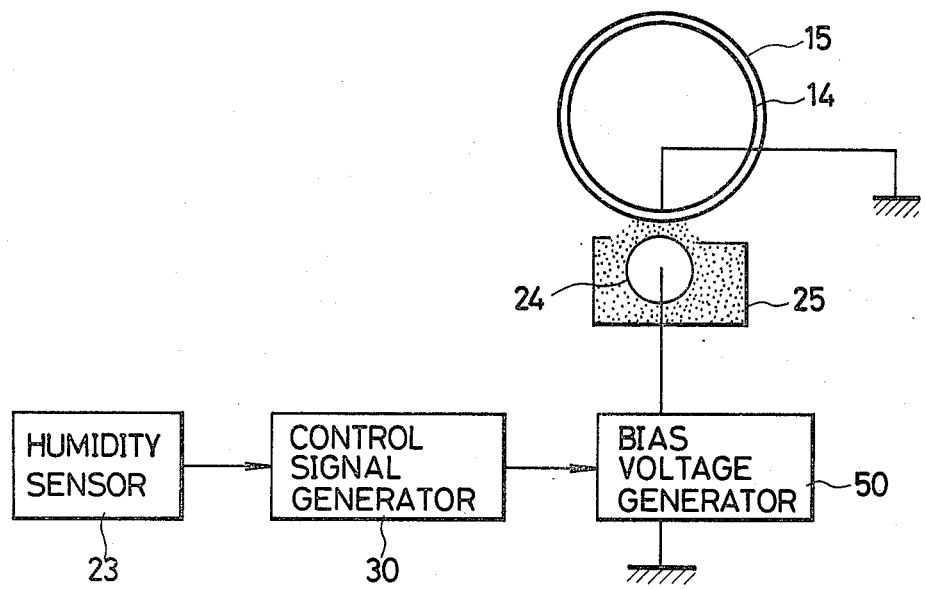
FIGS. 2, 3 and 4 are frequency spectrum diagrams of the systems A, B and C respectively, indicating the frequencies of the measuring and auxiliary EMW's.

Referring now to FIG. 2 and Table 1, the values of the measuring EMW's and auxiliary EMW's required to determined the distance between two positions that are a maximum of 100 km apart to a resolution of 1,0 m assuming that the phase measuring accuracy of the apparatus described earlier is 1 in 100 are shown.

It will be appreciated that since a go and return path is utilised, the equivalent wavelength of a measuring frequency F is $=C/2F$ where C is the velocity of EMW's. It may be assumed for the sake of argument that $C=3\times 10^8$ m/sec.

Further, to measure a distance of 100 km unambiguously the lowest pattern frequency required will need a wavelength of 100 m. The appropriate frequency will thus be $F_s=1,5$ KHz. Similarly, if the accuracy required is 1,0 m with a phase measuring accuracy of 1 in 100, the highest pattern frequency will have a wavelength of 100 m. Thus, the highest pattern frequency will be 1,5 MHz. Thus, using a base $b=10$ four pattern frequencies are required to give an unambiguous determination of the distance. Hence, the required pattern frequencies are $F_s=0,0015$ MHz;

$F_s b=0,015$ MHz;

$F_s b^2=0,15$ MHz;

and $F_s b^3=1,5$ MHz.

Utilising these values and setting the highest measuring EMW at a frequency $F_{m1} = F_s b^3$, then the measuring EMW's have the following frequency values:

$$F_{m1} = F_s b^3 = 1,5 \text{ MHz};$$

$$F_{m2} F_{m1} - F_s b^2 = 1,35 \text{ MHz};$$

$$F_{m3} = F_{m2} + F_s b = 1,365 \text{ MHz};$$

$$F_{m4} = F_{m2} + F_s = 1,3515 \text{ MHz}.$$

Similarly, the auxiliary EMW has a frequency value $$F_a = F_{m1} - 0.5 \, F_s b^2 = 1,425 \text{ MHz}.$$

The comparison frequencies for the various measuring EMW's will thus be 60 KHz, 73.5 KHz and 75 KHz. Thus, the I.F. amplifiers 24 and 40 will have bandwidths of the order of 300 KHz in order to pass only the first sidebands resulting from the heterodyning of any one of the measuring EMW's and the auxiliary EMW. Further, the amplifiers 24 and 40 must have transfer characteristics with a suitably small phase shift value at 75 KHz on either side.

Thus, as indicated in Table 1 and FIG. 2, the phase angles resulting from the various measuring EMW's may be used directly or substracted from one another, to provide the equivalent phase shifts at the pattern frequencies.

The table also shows that a sum value at $2F_a$ (= 2,85 MHz in the example) may be obtained. Thus, the phase angles resulting from the measuring EMW's at frequencies $F_{m1}$ and $F_{m2}$ may be added to provide a phase shift value at an equivalent frequency of $2F_a$. As described earlier, this phase shift value will be substantially free of any errors introduced by the equipment. It will be further understood that the various phase shifts determined by the apparatus may be indicated as a number of integral cycles and a fractional value. The fractional value of the phase shift provided by the measuring EMW of frequency $F_{m1}$ is of highest significance and must be as free of errors as possible. The phase angle derived from the sum of the phase angles at frequencies $F_{m1}$ and $F_{m2}$ may then be utilised to error-correct the phase angle for frequency $F_{m1}$ as follows. The total phase angle for the highest measuring frequency ($F_{m1}$) derived from the partial measurements is converted to an equivalent phase angle at frequency $2F_a$ by multiplying this total phase angle by a factor equal to $2F_a/F_{m1}$. Thus, in the present example, the total phase angle must be multiplied by 1,9. The equivalent fractional value of the phase shift computed as above is then corrected to the fractional value obtained from the sum of the $F_{m1}$ and $F_{m2}$ phase angle. This value is then converted back by dividing by the above factor.

Figure 3:
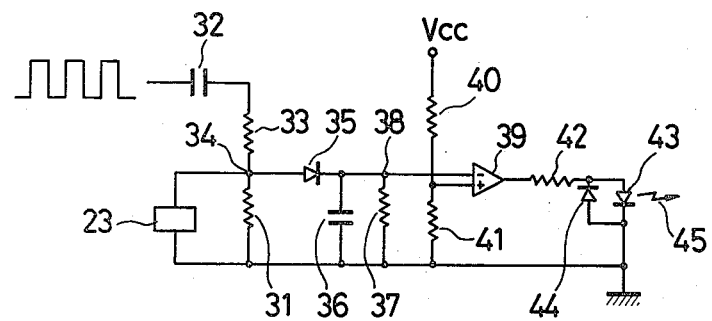

Referring now to Table 2 and FIG. 3 a further system B is described in which both of the auxiliary EMW's generated by the remote unit 14 are utilised.

Thus, in order to provide an unambiguous determination for distances up to 100 km, with a resolution of 0,1 m for a 100:1 phase measurement, a minimum pattern frequency of 1,5 KHz and a maximum pattern frequency of 15 MHz is required. Thus, the following pattern frequencies to a base 10 are required:

$$F_s = 0,0015 \text{ MHz};$$

$$F_s b = 0,015 \text{ MHz};$$

$$F_s b^2 = 0,15 \text{ MHz};$$

$$F_s b^3 = 1,5 \text{ MHz};$$

and $$F_s b^4 = 15,0 \text{ MHz}.$$

As will be appreciated from Table 2, $$F_{m1} = F_s b^4 = 15 \text{ MHz};$$

$$F_{m2} = F_s b^3 = 1,5 \text{ MHz};$$

$$F_{m3} = F_{m2} - F_s b^2 = 1,35 \text{ MHz};$$

$$F_{m4} = F_{m3} + F_s b = 1,365 \text{ MHz};$$

$$F_{m5} = F_{m3} + F_s = 1,3513 \text{ MHz};$$

and $$F_{m6} = F_{m1} - F_s b^2 = 14,85 \text{ MHz}.$$

Further,
$$F_{a1} = F_{m1} - 0,5 F_s b^2 = 14,925 \text{ MHz};$$

and $$F_{a2} = F_{m2} - 0.5 F_s b^2 = 1,425 \text{ MHz}.$$

Figure 4:
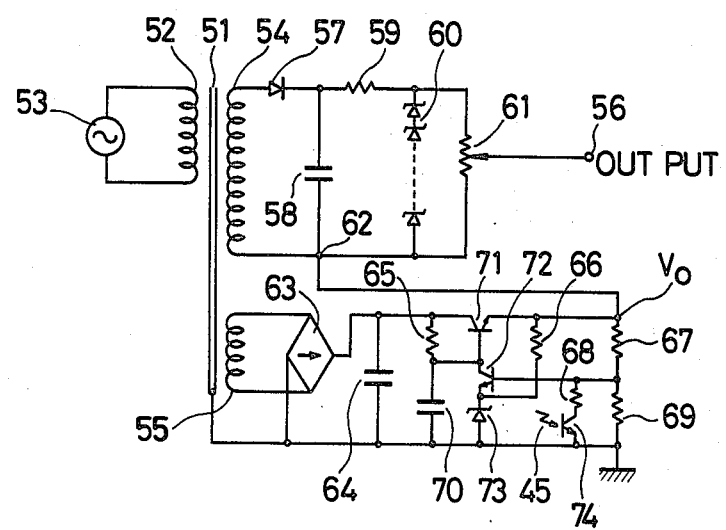

Referring to system C as indicated in Table 3 and FIG. 4, assuming similar conditions to those indicated above for system B, the measuring EMW's and auxiliary EMW's will have the following frequencies:

$$F_{m1} = F_s b^4 = 15 \text{ MHz};$$

$$F_{m2} = F_{m1} - F_s b^3 = 13,5 \text{ MHz};$$

$$F_{m3} = F_{m2} - F_s b^2 = 13,35 \text{ MHz};$$

$$F_{m4} = F_{m3} + F_s b = 13,365 \text{ MHz};$$

$$F_{m5} = F_{m3} + F_s = 13,3515 \text{ MHz};$$

$$F_{a1} = F_{m1} - 0,5 F_s b^2 = 14,925 \text{ MHz};$$

$$F_{a2} = F_{m2} - 0,5 \, F_s b^2 = 13,425 \text{ MHz}.$$

Thus, by these means, the remote unit may generate only one or two signals on a continuous and simultaneous basis, the appropriate measuring EMW's being sequentially generated only at the master station, thereby considerably reducing the cost of the remote unit, increasing the speed at which the distance between the two units may be determined, in a more reliable manner.

The invention is further described by the following three Examples:

EXAMPLE 1

With a system shown in FIG. 2 and Table 1 and having the following measuring frequencies and auxiliary frequency:

$$F_{m1} = 1,5 \text{ MHz};$$

$$F_{m2} = 1,35 \text{ MHz};$$

$$F_{m3} = 1,365 \text{ MHz};$$

$$F_{m4} = 1,3515 \text{ MHz};$$

$F_a = 1,425$ MHz, the following fractional phase shift values were obtained:

$\phi_{m1} = 36$ $\phi_{m2} = 92$ $\phi_{m3} = 17$ $\phi_{m4} = 25.$

These phase shift values are then utilised to obtain fractional phase shift values at the pattern frequencies indicated, as follows:

| At $F_s b^3$ | = 1,5 MHz | $\phi_{p1} = \phi_{m1}$ | = 36 |
|---|---|---|---|
| At $F_s b^2$ | = 150 KHz | $\phi_{p2} = \phi_{m1} - \phi_{m2}$ | = (1)36-92 = 44 |
| At $F_s b$ | = 15 KHz | $\phi_{p3} = \phi_{m3} - \phi_{m2}$ | = (1)17-92 = 25 |
| At $F_s$ | = 1,5 KHz | $\phi_{p4} = \phi_{m4} - \phi_{m2}$ | = (1)25-92 = 33 |

It will thus be appreciated that the total phase shift at frequency $F_{p1} = F_s b^3$ is

```
              3(30,00)
              2(5,00)
              4,(40)
               ,36
    φ Tp1 =   324,36 cycles.
```

Assuming that the speed of light is $C = 3 \times 10^8$ m/sec, then the wavelength at frequency $F_{p1}$ is $p1 = 3 \times 10^8 / F_{p1}$ meters.
$= 3 \times 10^8 / 1,5 \times 10^6 = 200$ meters.

Thus, a total phase shift of $\phi_{Tp1}$ corresponds to a distance of 64872 meters. However, as this represents the go and return paths, the distance between the two positions is 32436 meters.

EXAMPLE 2

In the above Example 1 it is assumed that no internal errors are introduced by the apparatus. If it is assumed that the apparatus introduces a constant 2% error, then the following readings would be obtained:

$\phi_{m1} = 38$ $\phi_{m2} = 90$ $\phi_{m3} = 15$ $\phi_{m4} = 23.$

It will be noted that $\phi_{m1}$ is increased by 2 whereas $\phi_{m2}$, $\phi_{m3}$ and $\phi_{m4}$ are decreased by 2. This is so as $F_{m1}$ is greater than $F_a$, whereas $F_{m2}$, $F_{m3}$ and $F_{m4}$ are all less.

This then gives fractional phase shift values of $\phi_{p1} = 38$ $\phi_{p2} = 48$ $\phi_{p3} = 29$ $\phi_{p4} = 37$ In the same manner as above an ambiquity resolved total phase shift $\phi_{Tp1} = 324,38$ cycles is obtained. This is error corrected by converting it to an equivalent total phase shift at frequency $2F_a$ by multiplying it by a factor $K = 2F_a/F_{m1} = 1,9$.

Thus $\phi_{T2Fa} = 616,322.$

Further, the frational phase shift for frequency $2F_a$ is $\phi_{m1} + \phi_{m2} = (1),28.$ The fractional value of $\phi_{T2Fa}$ is then corrected to this value to give $\phi^c_{T2Fa} = 616,28.$ This value is then divided by 1,9 to give $\phi^c_{Tp1} = 324,35789$ which is rounded off to
$= 324,36$ cycles.

This is then processed as above to give a distance of 32436 meters.

EXAMPLE 3

With a system B shown in FIG. 3 and Table 2, with measuring EMW's and auxiliary EMW's having the frequencies shown above for system B and system C the following fractional phase shift values were obtained:

$\phi_{m1} = 87$ $\phi_{m2} = 29$ $\phi_{m3} = 66$ $\phi_{m4} = 82$ $\phi_{m5} = 77$ The pattern phase shift values are then obtained as follows:

| At $F_{p1}$ = 15,0 MHz | $\phi_{p1} = \phi_{m1}$ | = 87 |
|---|---|---|
| At $F_{p2}$ = 1,5 MHz | $\phi_{p2} = \phi_{m2}$ | = 29 |
| At $F_{p3}$ = 150 KHz | $\phi_{p3} = \phi_{m2} - \phi_{m3}$ | = 63 |
| At $F_{p3}$ = 15 KHz | $\phi_{p4} = \phi_{m4} - \phi_{m3}$ | = 16 |
| At $F_{p5}$ = 1,5 KHz | $\phi_{p5} = \phi_{m5} - \phi_{m3}$ | = 11. |

This then gives an ambiguity corrected total phase shift at frequency $F_{p1} = 15$ MHz of $\phi_{Tp1} = 1162,87$ cycles.

At a speed of light of $3 \times 10^8$ m/sec this then gives a distance between the two positions, assuming zero internal error, of 11628,7 meters.

TABLE 1
SYSTEM A

| REMOTE AUXILIARY FREQUENCY (FIXED) | MASTER MEASURING FREQUENCIES (STEPPED) | COMPARISON SIGNAL FREQUENCIES | PATTERN FREQUENCIES DIRECT | SUM | DERIVED FROM STEPS | DIFF. | FROM STEPS | NO. OF TERMS IN SERIES |
|---|---|---|---|---|---|---|---|---|
| $F_a$ | $F_{m1}$ | $\frac{F_s}{2} b^2$ | $F_s b^3$ | | | | | |
| | $F_{m2}$ | $\frac{F_s}{2} b^2$ | | $2F_a$ | $F_{m1}$ & $F_{m2}$ | $F_s b^2$ | $F_{m1}$ & $F_{m2}$ | |
| | $F_{m3}$ | $\frac{F_s}{2} b^2 \left(1 - \frac{2}{b}\right)$ | | | | $F_s b$ | $F_{m2}$ & $F_{m3}$ | 4 |
| | $F_{m4}$ | $\frac{F_s}{2} b^2 \left(1 - \frac{2}{b^2}\right)$ | | | | $F_s$ | $F_{m2}$ & $F_{m4}$ | |

TABLE 2
SYSTEM B

| REMOTE AUXILIARY FREQUENCY (FIXED) | MASTER MEASURING FREQUENCIES (STEPPED) | COMPARISON SIGNAL FREQUENCIES | PATTERN FREQUENCIES DIRECT | SUM | DERIVED FROM STEPS | DIFF. | FROM STEPS | NO. OF TERMS IN SERIES |
|---|---|---|---|---|---|---|---|---|
| $F_{a1} = F_s b^4 - \frac{F_3 b^2}{2}$ | $F_{m1}$ | $\frac{F_s}{2} b^2$ | $F_s b^4$ | | | | | |
| $F_{a2} = F_s b^3 - \frac{F_s b^2}{2}$ | $F_{m2}$ | $\frac{F_s}{2} b^2$ | $F_s b^2$ | | | | | |
| | $F_{m3}$ | $\frac{F_s}{2} b^2$ | | $2F_{a2}$ | $F_{m2}$ & $F_{m3}$ | $F_s b^2$ | $F_{m2}$ & $F_{m3}$ | 5 |
| | $F_{m4}$ | $\frac{F_s}{2} b(b-2)$ | | | | $F_s b$ | $F_{m3}$ & $F_{m4}$ | |
| | $F_{m5}$ | $\frac{F_s}{2} (b^2 - 2)$ | | | | $F_s$ | $F_{m3}$ & $F_{m5}$ | |
| | $F_{m6}$ | $\frac{F_s}{2} b^2$ | | $2F_{a1}$ | $F_{m1}$ & $F_{m6}$ | | | |

TABLE 3
SYSTEM C

| REMOTE AUXILIARY FREQUENCY (FIXED) | MASTER MEASURING FREQUENCIES (STEPPED) | COMPARISON SIGNAL FREQUENCIES | PATTERN FREQUENCIES DIRECT | SUM | DERIVED FROM STEPS | DIFF. | FROM STEPS | NO. OF TERMS IN SERIES |
|---|---|---|---|---|---|---|---|---|
| | $F_{m1}$ | $\frac{F_s}{2} b^2$ | $F_s b^4$ | | | | | |
| $F_{a1} = F_s b^4 - \frac{F_s b^2}{2}$ | $F_{m2}$ | $\frac{F_s}{2} b^2$ | | | | $F_s b^3$ | $F_{m1}$ & $F_{m2}$ | |
| $F_{a2} = F_s b^4 - \frac{F_s b^2}{2} - F_s b^3$ | $F_{m3}$ | $\frac{F_s}{2} b^2$ | | $2F_{a2}$ | $F_{m1}$ & $F_{m2}$ | $F_s b^2$ | $F_{m2}$ & $F_{m3}$ | |
| | $F_{m4}$ | $\frac{F_s}{2} b(b-2)$ | | | | $F_s b$ | $F_{m3}$ & $F_{m4}$ | 5 |
| | $F_{m5}$ | $\frac{F_s}{2} (b^2 - 2)$ | | | | $F_s$ | $F_{m3}$ & $F_{m5}$ | |

SCHEDULE C

| REMOTE AUXILIARY FREQUENCY (FIXED) | MASTER MEASURING FREQUENCIES (STEPPED) | COMPARISON SIGNAL FREQUENCIES | PATTERN FREQUENCIES DIRECT | SUM | DERIVED FROM STEPS | DIFF. | FROM STEPS | NO. OF TERMS IN SERIES |
|---|---|---|---|---|---|---|---|---|
| | $F_{m6}$ | $\frac{F_s}{2} b^2$ | | $2F_{a1}$ | $F_{m1}$ & $F_{m6}$ | $F_s b^2$ | $F_{m5}$ & $F_{m6}$ | |

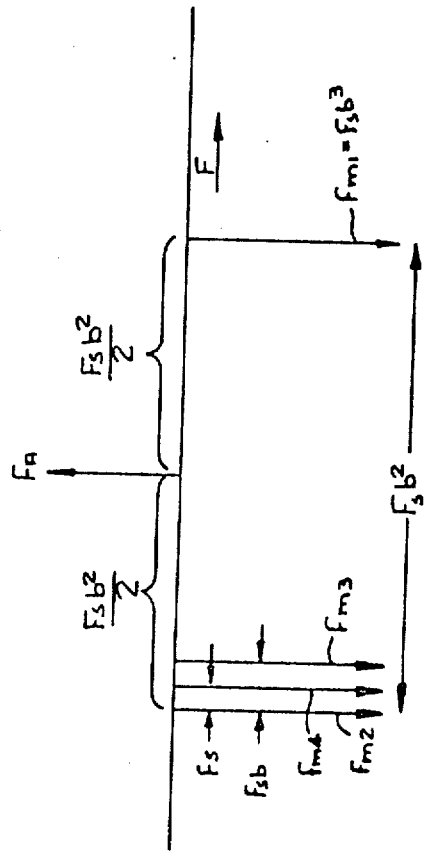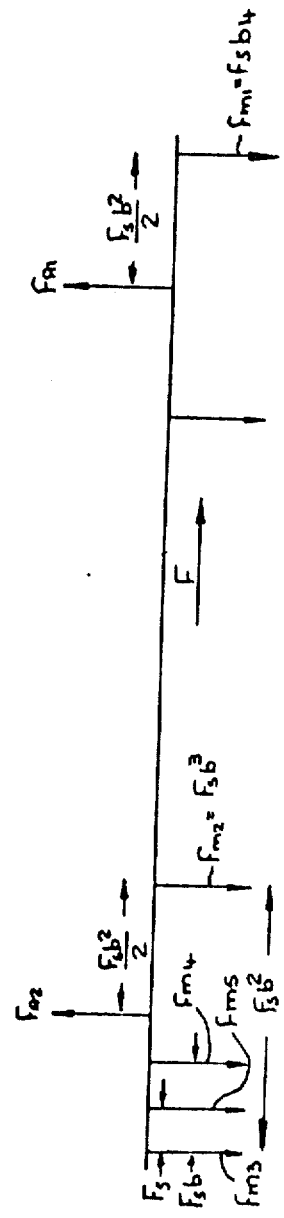

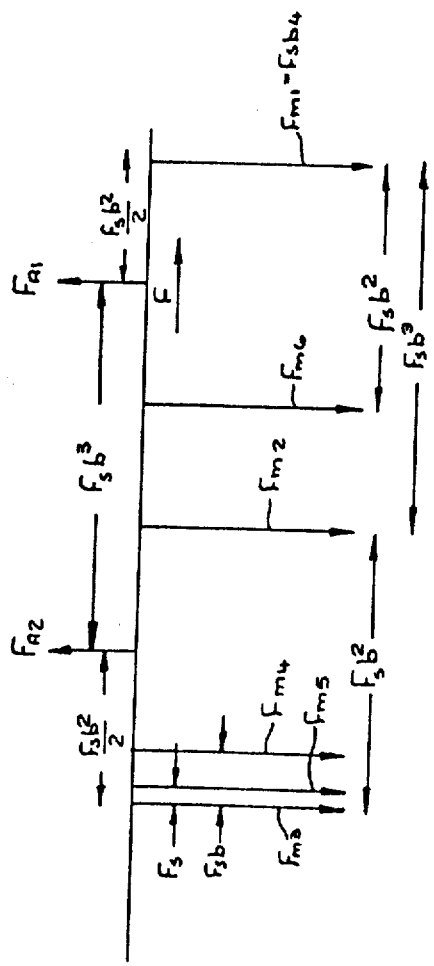

I claim:
1. A method of determining the linear separation between a first and a second position, including generating at the second position an auxiliary electromagnetic wave (EMW) of a constant predetermined frequency; sequentially generating at the first position a series of at least three measuring EMW's that have frequencies that are suitably different from one another and suitably different from that of the auxiliary EMW;

transmitting the auxiliary EMW, and sequentially each measuring EMW between the two positions;

determining the propagation phase shift of each measuring EMW utilising the auxiliary EMW; and processing the phase shifts of the various measuring EMW's to determine the distance between the first and second positions.

2. A method as claimed in claim 1, in which for each measuring EMW a remote comparison EMW representative of the difference between the received measuring EMW and the auxiliary EMW is generated at the second position;

the remote comparison EMW is also transmitted from the second position to the first position and received at the first position;

a master comparison EMW representative of the difference between the measuring EMW and the received auxiliary EMW is generated at the first position; and the difference in phase between the master comparison EMW and the received remote comparison EMW is determined at the first position; and the phase values between the master comparison EMW's and the received remote comparison EMW's for the various measuring EMW's are processed to determine the distance between the first and second positions.

3. A method as claimed in claim 2, in which the remote comparison EMW's and the master comparison EMW's are generated by heterodyning the received measuring EMW's and the auxiliary EMW, and the received auxiliary EMW and the measuring EMW's respectively.

4. A method as claimed in claim 1, which includes generating some of the measuring EMW's at frequencies lower than that of the auxiliary EMW and some of the measuring EMW's at frequencies higher than that of the auxiliary EMW.

5. A method as claimed in claim 1, which includes generating a first one of the measuring EMW's at a frequency a predetermined amount higher than the frequency of the auxiliary EMW and a second one of the measuring EMW's at a frequency the same amount lower than that of the auxiliary EMW.

6. A method as claimed in claim 5, which includes generating a first one of the measuring EMW's at a frequency that is greater than the frequency of the auxiliary EMW by half the frequency of a desired first pattern EMW and a second one of the measuring EMW's at a frequency that is lower than that of the auxiliary EMW by half the frequency of the desired first pattern EMW.

7. A method as claimed in claim 1, which includes generating a first measuring EMW at the same frequency as a first pattern EMW that has the highest frequency, and generating a second measuring EMW at a frequency equal to that of the first measuring EMW minus the frequency of the pattern EMW having the next lower frequency.

8. A method as claimed in claim 1, in which a suitable master carrier EMW is generated at the first position;

each measuring EMW is sequentially modulated onto the master carrier EMW;

the modulated master carrier EMW is transmitted from the first position and received at the second position;

the received modulated master carrier EMW is demodulated at the second position to provide the received measuring EMW's;

a suitable remote carrier EMW is generated at the second position;

the auxiliary EMW is modulated onto the remote carrier EMW;

the modulated remote carrier EMW is transmitted from the second position and received at the first position; and the received modulated remote carrier EMW is demodulated at the first position to provide the received auxiliary EMW.

9. A method as claimed in claim 8, which includes generating the master carrier EMW and the remote carrier EMW at frequencies between 1 GHz and 150 GHz.

10. A method as claimed in claim 8, which includes generating the master carrier EMW and the remote carrier EMW at frequencies that differ by between 1 MHz and 100 MHz.

11. A method as claimed in claim 1, which includes generating the measuring EMW's at suitable frequencies to provide pattern frequencies of values $F_s$, $F_s b$, $F_s b^2$, ..., $F_s b^n$, where $F_s$ has a corresponding wavelength which is at least as great as the longest distance to be determined unambiguously, b is a suitable base and n is sufficiently great for the highest pattern frequency $F_s b^n$ to be sufficiently large to determine the distance to the required degree of accuracy.

12. A method as claimed in claim 11, which includes generating the measuring EMW of highest frequency at a frequency $F_{m1} = F_s b^n$;

generating the measuring EMW of lowest frequency at a frequency $F_{m2} = F_{m1} - F_s b^{n-1}$; and generating the other measuring EMW's at frequencies that differ from $F_{m1}$, $F_{m2}$, and one another by the values $F_s b^{n-2}$, $F_s b^{n-3}$, ..., $F_s$.

13. A method as claimed in claim 1, in which a plurality of auxiliary EMW's at constant predetermined frequencies are simultaneously generated at the second position, a plurality of the measuring EMW's being associated with a first one of the auxiliary EMW's and at least one further measuring EMW being associated with each of the other auxiliary EMW's, a different measuring EMW being associated with each auxiliary EMW.

14. A method as claimed in claim 13, which includes generating all the measuring EMW's at frequencies that differ from the frequency of their associated auxiliary EMW by a value less than a suitably small maximum predetermined amount, and generating the auxiliary EMW's at suitably different frequencies, the measuring EMW's associated with any auxiliary EMW having frequencies sufficiently different from those of the other measuring EMW's such that the appropriate auxiliary EMW associated with any measuring EMW may be automatically utilized; and automatically utilizing the appropriate auxiliary EMW associated with any measuring EMW.

15. A method as claimed in claim 13, which includes generating a first auxiliary EMW at a frequency $F_{a1} = F_s b^n \pm 0.5 F_s b^{n-2}$; and generating a second auxiliary EMW at a frequency $F_{a2} = F_s b^{n-1} \pm 0.5 F_s b^{n-2}$ where $F_s$ has a corresponding wavelength which is at least as great as the longest distance to be determined unambiguously, b is a suitable base and n is sufficiently great for the highest pattern frequency $F_s b^n$ to be sufficiently large to determine the distance to the required degree of accuracy, n being greater than 2.

16. A method as claimed in claim 13, which includes generating a first auxiliary EMW at a frequency $F_{a1} = F_s b^n \pm 0.5 \, F_s b^{n-2}$; and generating a second auxiliary EMW at frequency $F_{a2} = F_s b^n - F_s b^{n-1} \pm 0.5 \, F_s b^{n-2}$, where $F_s$ has a corresponding wavelength which is at least as great as the longest distance to be determined unambiguously, b is a suitable base and n is sufficiently great for the highest pattern frequency $F_s b^n$ to be sufficiently large to determine the distance to the required degree of accuracy, n being greater than 2.

17. An apparatus for determining the linear separation between a first and a second position, including
an auxiliary EMW generating means, locatable at the second position for generating at the second position an auxiliary EMW at a constant predetermined frequency;
a measuring EMW generating means, locatable at the first position for sequentially generating at the first position a series of at least three measuring EMW's that have frequencies that are suitably different from one another and suitably different from that of the auxiliary EMW;
a transmitting means for transmitting the auxiliary EMW, and sequentially each measuring EMW between the two positions; and
a phase shift determining means for determining the propagation phase shift of each measuring EMW utilising the auxiliary EMW.

18. An apparatus as claimed in claim 17, which includes
a master transmitting and receiving means locatable at the first position for transmitting the measuring EMW's from the first position to the second position and for receiving signals transmitted from the second position;
a remote transmitting and receiving means locatable at the second position for receiving the measuring EMW's transmitted from the first position and for transmitting from the second position to the first position the auxiliary EMW and a first phase value of the received measuring EMW at the second position utilizing the auxiliary EMW;
a first phase value deriving means locatable at the second position for deriving the first phase value of the received measuring EMW;
a second phase value deriving means locatable at the first position for deriving a second phase value of the auxiliary EMW received at the first position; and
a processing means for processing the first phase value and the second phase value to provide a signal equivalent to the phase shift of the measuring EMW.

19. An apparatus as claimed in claim 18, which includes
a master carrier EMW generating means locatable at the firs position for generating at the first position a suitable master carrier EMW modulated by the measuring EMW generated at the first position;
the master transmitting and receiving means being arranged to transmit the modulated master carrier EMW from the first position to the second position;
the remote transmitting and receiving means being arranged to receive the modulated master carrier EMW at the second position and to demodulate the received modulated master carrier EMW at the second position to provide a received measuring EMW; and
a remote carrier EMW generating means locatable at the second position for generating at the second position a suitable remote carrier EMW modulated by the auxiliary EMW generated at the second position;
the remote transmitting and receiving means also being arranged to transmit the modulated remote carrier EMW from the second position to the first position, and the master transmitting and receiving means being arranged to receive the modulated remote carrier EMW at the first position and to demodulate the received modulated remote carrier EMW at the first position to provide a received auxiliary EMW.

20. An apparatus as claimed in claim 19, in which the master carrier EMW generating means and the remote carrier EMW generating means comprises means for generating master and remote carrier EMW's at frequencies between 1 GHz and 150 GHz.

21. An apparatus as claimed in claim 20, in which the master carrier EMW generating means and the remote carrier EMW generating means comprise means for generating master and remote carrier EMWs at frequencies that differ between 1 MHz and 100 MHz.

22. An apparatus as claimed in claim 18, in which
the remote transmitting and receiving means is such that it heterodynes each received measuring EMW with the auxiliary EMW supplied to it for transmission to the first position to generate a remote comparison EMW representative of the difference between each measuring EMW and auxiliary EMW at the second position, said remote transmitting and receiving means being arranged to transmit this remote comparison EMW from the second position to the first position;
the master transmitting and receiving means is arranged to receive the transmitted remote comparison EMW and to heterodyne each measuring EMW supplied to it for transmission with the received auxiliary EMW at the first position to provide a master comparison EMW representative of the difference between each measuring EMW and the received auxiliary EMW at the first position; and
the processing means is in the form of a comparison EMW phase difference determining means locatable at the first position and arranged to determine the difference in phase between the master comparison EMW and the received remote comparison EMW at the first position for the various measuring EMW's.

23. An apparatus as claimed in claim 17 in which the measuring EMW generating means comprises means for generating some measuring EMW's at a frequency lower than that of the auxiliary EMW and some measuring EMW's at a frequency higher than that of the auxiliary EMW.

24. An apparatus as claimed in claim 17, in which the measuring EMW generating means comprises means for generating a first one of the measuring EMW's at a frequency a predetermined amount higher than the frequency of the auxiliary EMW and a second one of the measuring EMW's at a frequency the same amount lower than that of the auxiliary EMW.

25. An apparatus as claimed in claim 24, in which the measuring EMW generating means comprises means for generating said first one of the measuring EMW's at a frequency that is greater than the frequency of the auxiliary EMW by half the frequency of a desired pattern EMW, for generating said second one of the measuring EMW's at a frequency that is lower than that of the auxiliary EMW by half the frequency of the desired first pattern EMW.

26. An apparatus as claimed in claim 17, in which the measuring EMW generating means comprises means for generating a first measuring EMW having the same frequency as a first pattern EMW that has the highest frequency and for generating a second measuring EMW having a frequency equal to that of the first measuring EMW minus the frequency of the pattern EMW having the next lower frequency.

27. An apparatus as claimed in claim 17, in which the measuring EMW generating means generates measuring EMW's having suitable frequencies to provide pattern frequencies of values $F_s, F_s b, F_s b^2, \ldots, F_s b^n$, where $F_s$ has a corresponding wavelength which is at least as great as the longest distance to be determined unambiguously, b is a suitable base and n is sufficiently great for the highest pattern frequency $F_s b^n$ to be sufficiently large to determine the distance to the required degree of accuracy.

28. An apparatus as claimed in claim 20, in which the measuring EMW generating means comprises means for
- a measuring EMW of highest frequency having a frequency $F_{m1} = F_s b^n$;
- a measuring EMW of lowest frequency having a frequency $F_{m2} = F_{m1} - F_s b^{n-1}$; and
- other measuring EMW's having frequencies that differ from $F_{m1}$, $F_{m2}$, and one another by the values $F_s b^{n-2}, F_s b^{n-3}, \ldots, F_s$.

29. An apparatus as claimed in claim 17, in which the auxiliary EMW generating means generates simultaneously a plurality of auxiliary EMW's at constant predetermined frequencies at the second position, a plurality of the measuring EMW's being associated with the first one of the auxiliary EMW's and at least one further measuring EMW being associated with each of the other auxiliary EMW's, a different measuring EMW being associated with each auxiliary EMW.

* * * * *

UNITED STATES PATENT AND TRADEMARK OFFICE
CERTIFICATE OF CORRECTION

PATENT NO. : 4,307,397

DATED : December 22, 1981

INVENTOR(S) : Hobbe Dirk Holscher

It is certified that error appears in the above—identified patent and that said Letters Patent is hereby corrected as shown below:

Delete Sheets 2 and 3 comprising Figures 2, 3 and 4 and substitute sheets 2 and 3 as shown on the attached sheets.

Signed and Sealed this

Thirtieth Day of March 1982

[SEAL]

Attest:

*Attesting Officer*

GERALD J. MOSSINGHOFF
*Commissioner of Patents and Trademarks*